US008326911B2

(12) United States Patent
Weinert et al.

(10) Patent No.: US 8,326,911 B2
(45) Date of Patent: Dec. 4, 2012

(54) REQUEST PROCESSING WITH MAPPING AND REPEATABLE PROCESSES

(75) Inventors: Alexander T. Weinert, Seattle, WA (US); Kan Zhang, Shanghai (CN); Darren Wang, Shanghai (CN); Craig McMurtry, Sammamish, WA (US); Jasjeet Gill, Bellevue, WA (US); Asaf Kashi, Bellevue, WA (US); Bruce P. Bequette, Lynnwood, WA (US)

(73) Assignee: Microsoft Corporation, Redmond, WA (US)

( * ) Notice: Subject to any disclaimer, the term of this patent is extended or adjusted under 35 U.S.C. 154(b) by 1479 days.

(21) Appl. No.: 11/771,640

(22) Filed: Jun. 29, 2007

(65) Prior Publication Data

US 2008/0189705 A1 Aug. 7, 2008

Related U.S. Application Data

(60) Provisional application No. 60/888,027, filed on Feb. 2, 2007.

(51) Int. Cl.
*G06F 15/16* (2006.01)
*G06F 9/44* (2006.01)
*G06F 9/46* (2006.01)

(52) U.S. Cl. ........ 709/201; 717/162; 717/163; 717/164; 718/101

(58) Field of Classification Search .................. 718/101; 717/162, 163, 164; 709/201
See application file for complete search history.

(56) References Cited

U.S. PATENT DOCUMENTS

| | | | | |
|---|---|---|---|---|
| 5,768,506 | A | 6/1998 | Randell | |
| 6,088,679 | A | 7/2000 | Barkley | |
| 6,996,601 | B1 | 2/2006 | Smith | 709/203 |
| 7,725,200 | B2 | 5/2010 | Reed et al. | 700/30 |
| 7,865,371 | B2 * | 1/2011 | Shen | 705/2 |
| 2002/0174238 | A1 | 11/2002 | Sinn et al. | |
| 2003/0217264 | A1 | 11/2003 | Martin et al. | |
| 2004/0003353 | A1 | 1/2004 | Rivera et al. | |
| 2004/0078105 | A1 * | 4/2004 | Moon et al. | 700/100 |
| 2004/0078776 | A1 | 4/2004 | Moon et al. | |

(Continued)

FOREIGN PATENT DOCUMENTS

KR 10-2001-0063810 7/2001

(Continued)

OTHER PUBLICATIONS

Secureflow: A Secure Web-enabled Workflow Management System, Huang et al. pp. 83-93, 1999.*

(Continued)

*Primary Examiner* — Larry Donaghue
(74) *Attorney, Agent, or Firm* — Merchant & Gould, P.C.

(57) ABSTRACT

The embodiments described herein generally relate to a method and system of injecting repeatable processes, or workflows, into the processing of data-oriented or procedural requests in an entity management system. A request in such a system is subject to authentication, authorization, and action phases of processing, and workflows may be associated with each phase for automatic processing upon the triggering of a certain request under particular circumstances. A declarative mapping associates workflows with the request type, phase, requester, and target. The mapping may be created at the system administrator level, or by any person with the necessary capabilities, through the application of the processing concept in API or UI and may be consulted and invoked upon receipt of a request matching the mapping's criteria. Mappings may also be created and retrieved to manage state changes resulting from processing in other phases of the request processing model.

19 Claims, 11 Drawing Sheets

U.S. PATENT DOCUMENTS

| | | | | |
|---|---|---|---|---|
| 2005/0204362 | A1 | 9/2005 | Chatterjee et al. | |
| 2006/0116912 | A1 | 6/2006 | Maes | |
| 2006/0143273 | A1 | 6/2006 | Chao et al. | |
| 2006/0195347 | A1 | 8/2006 | Bultmeyer et al. | |
| 2007/0005692 | A1 | 1/2007 | Gist et al. | |
| 2007/0027915 | A1 | 2/2007 | Morris | |
| 2007/0236708 | A1* | 10/2007 | Jahn et al. | 358/1.6 |
| 2008/0189705 | A1 | 8/2008 | Weinert et al. | |
| 2009/0119500 | A1 | 5/2009 | Roth et al. | |
| 2011/0225001 | A1* | 9/2011 | Shen | 705/2 |

FOREIGN PATENT DOCUMENTS

| | | |
|---|---|---|
| KR | 10-2005-0070520 | 7/2005 |
| WO | 2005-067432 A2 | 7/2005 |

OTHER PUBLICATIONS

An Overview of Workflow Management: From Process Modelimng to Workflow Automation Infrastructure , Sheth et al. 119-153, 1995.*

Workflow-based applications , Leymann et al. pp. 102-123, 1999.*

Wahli et al., "Software Configuration Management—A Clear Case for IBM Rational ClearCase and ClearQuest UCM"; Dec. 2004, IBM.com/redbooks, 392 pgs.

U.S. Official Action dated Jan. 20, 2011cited in U.S. Appl. No. 11/934,619.

U.S. Appl. No. 11/934,619, Amendment and Response filed Jun. 20, 2011, 14 pgs.

U.S. Appl. No. 11/934,619, Final Office Action mailed Sep. 13, 2011, 8 pgs.

U.S. Appl. No. 11/934,619, Amendment and Response to Final Office Action filed Jan. 13, 2012, 10 pgs.

Ahn, et al., "Injecting RBAC to Secure a Web-based Workflow System," [online] [retrieved on Jul. 15, 2008]. Retrieved from the internet: <URL: http://citeseer.ist.psu.edu/cache/papers/cs/14806/http:zSzzSzwww.list.gmu. eduzSzconfrnczSzrbaczSzpdf__verzSzrbac-workflow.pdf/ahn00injecting.pdf>, 10 pages.

Haller, et al., "m3po: An Ontology to Relate Choreographies to Workflow Models," [online] [retrieved on Jul. 15, 2008] Retrieved from the internet: <URL: http://citeseer.ist.psu.edu/cache/papers/cs2/414/http:zSzzSzwww.eyaloren.orgzSzpubszSzscc2006.pdf/m-po-an-ontology.pdf>; 9 pages.

PCT International Search Report dated May 28, 2008 in Application No. PCT/US2008/052702, 10 pgs.

* cited by examiner

200

| | 202 | 204 | 206 |
|---|---|---|---|
| | Set X<br>Patent Attorneys<br>Department = Law<br>Title = Attorney<br>Specialty = Patent | Set Y<br>Computer Programmers<br>Department = CS<br>Title = Programmer<br>Specialty = Database | Set N<br>Full-Time Employees<br>Department = All<br>Title = Employee<br>Attribute = Full-Time |
| 208 | Joseph Brown | Greta Schaefer | Danielle Jones |
| 210 | Danielle Jones | Patrick Sullivan | Patrick Sullivan |
| 212 | Timothy Farnsworth | Erin Neison | Dennis Coughlin |

| | 216 | 218 | 220 |
|---|---|---|---|
| | Set T<br>Distribution List<br>Department = Mail<br>Attribute = Email | Set U<br>Part-Time Employees<br>Department = All<br>Title = Employee<br>Attribute = Part-Time | Set N<br>Security Group<br>Department = All<br>Title = Confidential |
| 222 | Jack Watson | Aimee Garrish | Candice Miller |
| 224 | Sheryl Missou | Alexander Blair | Thomas Salem |
| 226 | Darrel Johnson | Allison Autrey | Travers Montgomery |

Fig. 2B

REQUEST PROCESSING WITH MAPPING AND REPEATABLE PROCESSES

RELATED APPLICATION

This application claims priority to U.S. Provisional Application No. 60/888,027, filed on Feb. 2, 2007, and entitled, "Request Processing with Mapping and Repeatable Processes," which is hereby incorporated in its entirety for all that it teaches.

BACKGROUND

Computing systems are useful for managing data entities, i.e., records which represent entities, such as users, groups, computers, software systems. It is often desired to view or manipulate these entities in some manner. Procedural requests are used to cause such manipulation of entities. The use of computing systems for managing data entities in secure, mission critical and compliance sensitive environments has become prevalent. In such environments, it is desirable to cause certain processes to occur in response to specific requests for the manipulation, or even viewing, of data entities. For example, when a new employee desires to join an e-mail distribution list, the employee's identity may need to be verified, the person or entity owning the desired distribution list may need to approve of the addition, and the employee may expect to receive notification once such action has taken place. Having each of these steps occur requires the execution of several processes. Further, if the employee is indeed added to the distribution list, the system administrator may desire to cause other processes to run, such as to move the entire distribution list to a different distribution list if the size of the original list has exceeded a maximum number as a result of the addition of the new employee. Manual determination and execution of such processes by a system administrator is inefficient and may not be feasible at all in large organizations with multiple parties making multiple requests. Further, requiring a system administrator to create new programming code for each possible manipulation is also not realistic given the plethora of possible request combinations. The problem is exacerbated when a system administrator is responsible for data entity management of multiple related organizations or when compliance with intensive security requirements is required at multiple levels. The problem may be further exacerbated if the entities in and of themselves are not organized for processing.

Although specific problems have been addressed in this Background, this disclosure is not intended in any way to be limited to solving those specific problems.

SUMMARY

Embodiments of the present invention generally relate to associating repeatable business processes ("workflows") with any requests for certain operations on certain objects made by certain users under certain conditions. A particular embodiment uses a model for reasoning over the processing phases of entity management, referred to herein as the "Core Request Processing Model," and for providing the ability to associate workflows explicitly with each phase of processing of this model. Further embodiments relate specifically to the concept of "mapping," which is the concept of associating particular workflows with certain phases of the processing of certain types of requests. This association involves the injecting of workflows into the processing of data oriented or procedural requests ("requests") by requesting agents ("principals" or "requesters") on entities ("targets") based on whether they match predefined criteria defining groups of entities ("sets"). Further embodiments relate to the use of mapping to account for state changes resulting from a requested action. Further yet, embodiments relate to the formalization of the processing request model concept in application programming interfaces ("API") and user interfaces ("UI"), as well as the ability of the computer system to support rich semantic expressions of repeatable workflows associated with request processing.

As discussed herein, an aspect of a particular embodiment relates to the injection of workflow processing into the three phases of the Core Request Processing Model applicable to requests for automatic processing for certain circumstances. Requests in an entity management system are generally subject to at least three phases, namely, Authentication, Authorization, and Action. A fourth phase, Consequences Due to Set Transitions, i.e., consequence actions resulting from set transition events, may also be necessary if executed processes of a requested action result in a state change requiring further processing to manage such resulting change(s). Workflows may be associated with each of the four phases. For example, following system authentication, involving, by way of example only, simple token or certificate-based authentication by the system, certain workflows or activities within workflows requesting additional data to validate a principal's identity may be executed. Determining which workflows to run for each phase is defined by the mapping created by a system administrator or other person with such capabilities or permissions. A declarative mapping of the request phase to the desired workflow is created, stored and consulted in response to a request for determination of the workflows required for the particular conditions of the request, i.e., request type, set principal, set target, and phase. When a user makes a request, a mapping particular to the criteria of the request is consulted. The mapping thus dictates what workflows to be run, in which processing phases, and under what conditions. A mapping therefore associates workflows to processing phases dependent on the sets the principal belongs to and the sets the target belongs to.

Further embodiments relate to the ability of the system to process requests involving the attribute(s) of a particular set, wherein a "set" is a collection of entities matching criteria, which, in embodiments, such criteria are dynamically-evaluated and defined by the system administrator or any other person entitled to do so.

This Summary is provided to introduce a selection of concepts in a simplified form that are further described below in the Detailed Description. This Summary is not intended to identify key or essential features of the claimed subject matter, nor is it intended to be used in any way as to limit the scope of the claimed subject matter.

BRIEF DESCRIPTION OF THE DRAWINGS

FIG. 1 is merely an example of an environment for practicing the present invention.

FIG. 2A depicts exemplary sets containing requesting principals, or principal entities, for the conditional triggering of the workflows defined in the mapping of FIG. 1 in the processing stage depending on the principal issuing the request in accordance with an embodiment of the present invention.

FIG. 2B illustrates exemplary sets containing targets, or target entities, for the conditional triggering of the workflows defined in the mapping of FIG. 1 in the processing stage depending on the targets, or target entities, which the request affects in accordance with an embodiment of the present invention.

FIG. 6 is merely an example of possible operational characteristics for creating and storing a mapping. For example, mappings do not need to be stored in a database. Rather, FIG. 6 is merely an exemplary embodiment of the present invention.

DETAILED DESCRIPTION

Figure 1:
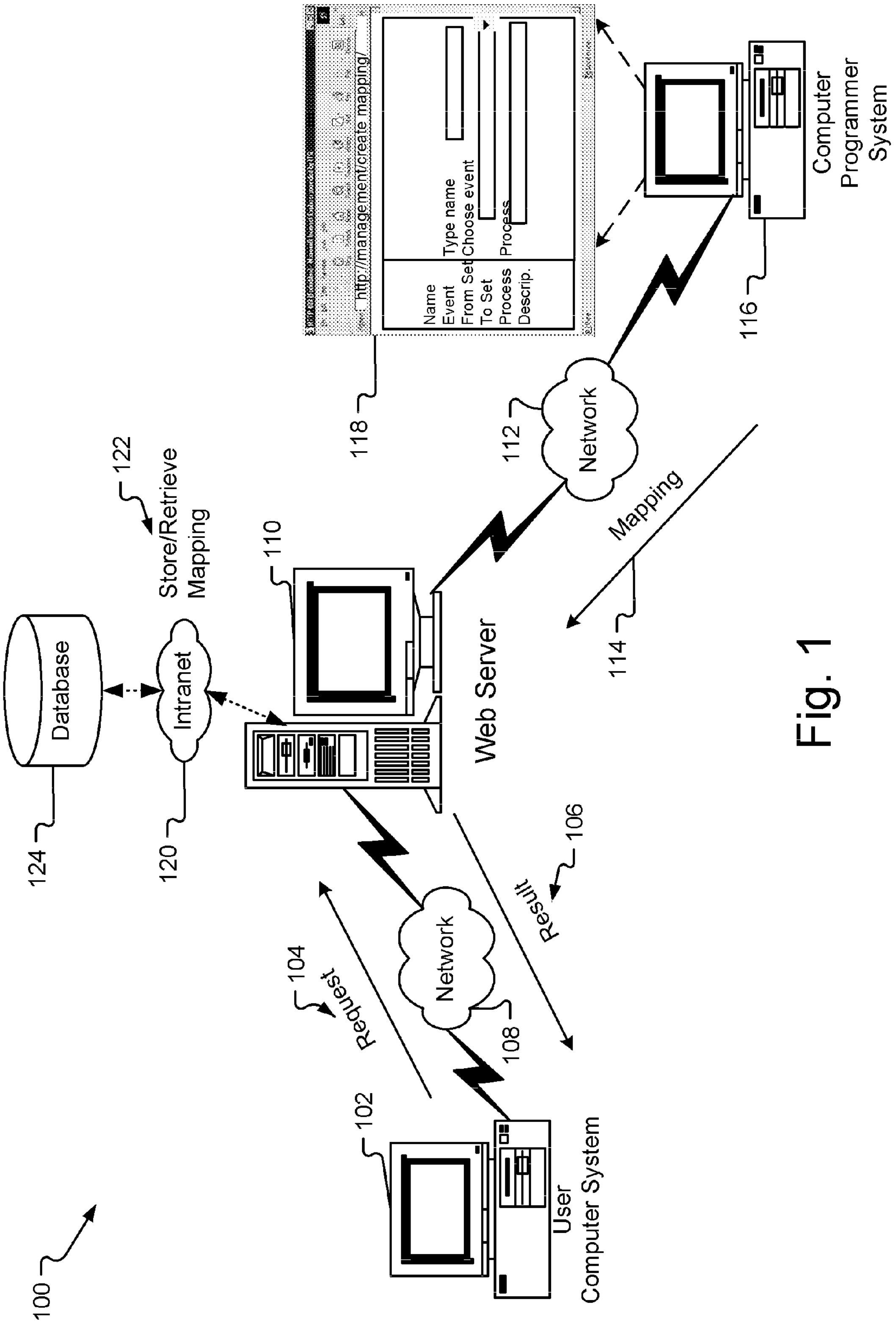
FIG. 1 illustrates an exemplary logical representation of a network environment for creating a mapping of workflows associated with processing phases under certain conditions, the storage of such mapping, and the invoking of such mapping upon a certain request type by a user in accordance with an embodiment of the present invention. Other embodiments involve mappings done post-compilation by persons other than programmers, other storage means, etc.

This disclosure will now more fully describe exemplary embodiments with reference to the accompanying drawings, in which specific embodiments are shown. Other aspects may, however, be embodied in many different forms and the inclusion of specific embodiments in this disclosure should not be construed as limiting such aspects to the embodiments set forth herein. Rather, the embodiments depicted in the drawings are included to provide a disclosure that is thorough and complete and which fully conveys the intended scope to those skilled in the art. Dashed lines may be used to show optional components or operations. Dashed lines may also be used to show logical representations or movement of a cell from one location to another.

A network environment 100 for creating and retrieving a mapping for request processing is shown in FIG. 1. In a particular embodiment, the user of computer system 102 makes a request 104 to be added to a distribution list. The request is transmitted across network 108 to web server 110. In response to this request 104, web server 110 retrieves a mapping 122, in which the predetermined mapping associates, or "maps," workflows, i.e., meaningful, repeatable processes, to processing phases depending on the request. In this example, i.e., where the user 102 wants to join a distribution list, the mapping would associate workflows specific to the current status of the user, e.g., a Full-Time Employee, and the particular distribution list which the user 102 wants to join, e.g., Employees Entitled to Benefits. The workflows which the mapping may designate as needing to be fired to accomplish such an action can include, for example, to validate the user 102's identity by running a specific authentication workflow, to make sure the user 102 is allowed to join by running a specific authorization workflow, etc. In this example, the mapping is retrieved over the intranet 120 from database 124 which stores mappings for particular requests. Mappings are stored in database 124 after being created by a system administrator or other person with similar permissions on computer programmer system 116. To create a mapping 114, a system administrator, computer programmer or other person with similar permissions uses the user interface ("UI") 118 for specifying the conditions and workflows for a particular request. Once created, the mapping 114 is transmitted over network 112 to the web server 110 for storage 122. The stored mapping may then be retrieved 122 in response to the user 102's particular request. The mapping causes other actions, i.e., workflows, to take place to automatically authorize the user, and/or notify other users of the request, among other things. After executing such workflows, the requested action, i.e., to join the requested distribution list, is taken in result step 106 over network 108. The benefits of such a system include increased efficiencies through reduced administrative overhead and improved speeds at responding to requests given that the determination and execution of processes becomes automatic after a mapping for a specific set of conditions is created. A system administrator is thus not required to create new programming code for each manipulation or request combination.

It is worth noting at the outset that FIG. 1 is merely an example of an environment for practicing the present invention. For example, FIG. 1 shows mappings created by a computer programmer. However, embodiments of the invention also cover, for example, defining mappings on systems post-compilation by an Information Technology ("IT") technician or other person with similar permissions. The scope of the present invention is thus in no way limited to a developer-only concept. Similarly, while store/retrieve mapping 122 and database 124 show mappings stored in the database, the present invention is in no way limited to such storage. Any number of means of storage could be understood by those of ordinary skill in the art in accordance with other embodiments of the present invention. Store/retrieve 122 and database 124 are thus shown by way of example only. Indeed, user system 102, web server 110, programmer system 116, networks 108 and 112, intranet 120, etc. are valid ways of practicing the present invention in accordance with an embodiment of the invention but are in no way intended to limit the scope of the invention. Further, the exemplary network environment 100 may be considered in terms of the specific components described, e.g., server, database, etc., or, alternatively, may be considered in terms of the analogous modules corresponding to such units, e.g., executing module, processing module, etc.

Similarly, while only one web server 110 is shown, more than one server computer or separate servers, e.g., a server farm (not shown), may be used in accordance with an embodiment of the present invention. Further, although only one user computer system 102 and one computer programmer system 116 are shown, multiple systems could communicate with web server 110. The network environment 100 is not limited to any particular implementation and instead embodies any computing environment upon which the functionality of the environment described herein may be practiced. Further, networks 108 and 112, although shown as two networks may be a single, private network, e.g., an intranet. In embodiments, networks 108 and 112 may be any type of network conventionally known to those skilled in the art. In accordance with an exemplary embodiment, the networks may be the global network (e.g., the Internet or World Wide Web, i.e., "Web" for short). They may also be a local area network or a wide area network. In accordance with embodiments of the present invention, communications over networks 108 and 112 occur according to one or more standard packet-based formats, e.g., H.323, IP, Ethernet, and/or ATM. Any conceivable environment or system may be understood by those of ordinary skill in the art. FIG. 1 is offered as an example only for purposes of understanding the teachings of the present invention.

Turning now to further details of the actual creation and retrieval of mappings, an entity management request made by a user is subject to three phases in accordance with an embodiment of the present invention. As shown in the exemplary network environment of FIG. 1, a request 104 is made to discover or manipulate an entity in some manner. Examples of a request in a data system include, although are not limited to, "Create," "Read," "Modify," or "Delete." In a procedural system, more semantically meaningful requests may be used, such as, for example, the request RetrieveSpecialEntities( ) or the request Compare(Entity1, Entity2). Network environment 100 is designed to support the injection of meaningful, repeatable processes, i.e., workflows, into the processing of requests by sets containing the requesting principal on target sets containing the target entity through a mapping of the request phase to the desired workflow. Each request is subject to three phases, and thus the association of workflows specific to each phase, which include: Authentication, Authorization, and Action. A fourth phase, i.e., Set Transitions, or Consequence as a Result of Set Transition Processing or Consequences Due to Set Transitions, to manage state changes caused by the action phase or other activities may also be required if such change(s) occur(s). Authentication is generally the first phase of request processing for entity processing systems and involves the determination of the identity of the principal making the request. The second phase, i.e., Authorization, involves the determination of whether the system should enact the specified request against the specified target. Finally, the third phase, i.e., Action, actually enacts the request and thus changes data or delivers results to the principal. The Action phase thus typically results in a result, which may be non-revocable according to some embodiments. Further, a fourth phase, Set Transitions, or consequence processing, may be run to manage state changes, if any, caused by the Action phase of the request.

In embodiments, a mapping associates workflows with each phase of the request processing. A mapping thus associates workflows to the phases dependent on the sets to which the principal belongs and the sets to which the target belongs. For example, with the request processing and mapping supported by system 100, a system administrator or person with similar permissions may define the following expression for creating a mapping for handling a specific request by a Full-Time Employee to join a Distribution List: "When a Full-Time Employee makes a Request to join a Distribution List, validate his/her identity by running the Smartcard Workflow, then Ensure they are allowed to join by running the AskManager Workflow, then follow up by running the NotifyRequestor Workflow." This expression is offered by way of example only to show the ability of network 100 to support rich semantic expressions of repeatable workflows integrated with request processing.

As can be seen, the expression defined for creating a mapping for handling a specific request uses rule-based sets, e.g., "Full-Time Employees," for organizing entities for processing. In some embodiments, rule-based sets are required as an organizing mechanism for principals and targets for request processing, such that administrative overhead is reduced. In other embodiments, they may not be required, but the system administrator (or other person with similar permissions) may perform an analysis on each set manually. The triggering of the workflows in a processing stage depends on what principal is issuing the request and on what target or targets such request affects. Because systems often reason over large collections of entities, an organizing mechanism is required in some embodiments. A collection of entities that match certain criteria is defined as a "set." In a particular embodiment, a set is a named filter over the collection of entities managed by the computing system which the system evaluates at the time a request is made to determine whether the principal or target match the constraints expressed by the filter. In some cases, a set may be only a single object. For instance, sufficiently restrictive constraints may specify a unique entity in the system and hence represent a single object, e.g., users with X.500 name dn=mlee@fabrikam.com. In other cases, entities can match more than one set definition, in which a set definition is the rules that contain the criteria for defining the set.

Through the use of mappings, sets can be used to determine which workflows should be run and at which processing phases. FIG. 2A illustrates examples of principal sets 202, 204 and 206. FIG. 2A also shows the rules which define the sets 202, 204 and 206, i.e., in the first row, as illustrated. Entities shown in the subsequent rows, such as 208, 210, and 212 in set 202, are examples of names of entities which meet the constraints of the rule defining set 202, i.e., "Joseph Brown," "Danielle Jones," and "Timothy Farnsworth." Likewise, rows 208, 210 and 212 also contain example names for sets 204 and 206. The criteria of principal entities "Joseph Brown," "Danielle Jones," and "Timothy Farnsworth" in rows 208, 210 and 212 match the criteria of set 202 and thus these entities belong to Set X 202. Similarly, FIG. 2B illustrates examples of target sets 216, 218 and 220. FIG. 2B also shows the rules which define the sets 216, 218 and 220, i.e., in the first row, as illustrated. Entities shown in the subsequent rows, such as 222, 224, and 226 in set T, are examples of names of entities which meet the constraints of the rule 216, i.e., "Jack Watson," "Sheryl Missou," and "Darrel Johnson." The criteria of target entities "Jack Watson," "Sheryl Missou," and "Darrel Johnson" in rows 222, 224, and 226 match the criteria of target set 216, and thus these entities belong to Set T 216. Likewise, rows 222, 224 and 226 also contain example names for sets 218 and 220. Sets can also be defined in terms of other sets in accordance with other embodiments.

Figure 3:
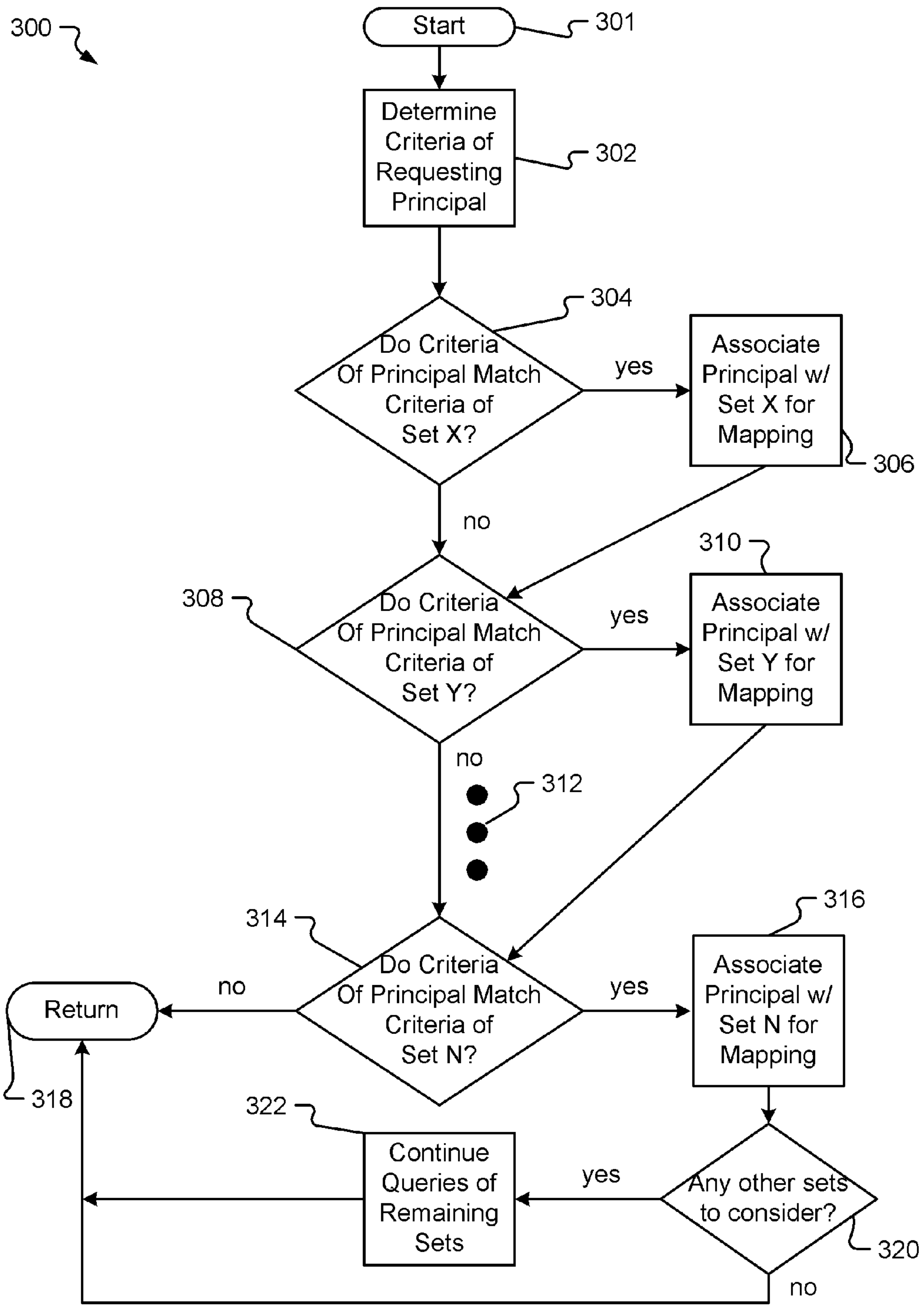
FIG. 3 depicts an exemplary flow diagram illustrating the operational characteristics of a process for associating a principal entity with a certain rule-based set of FIG. 2A in accordance with an embodiment of the present invention.

FIG. 3 illustrates some of the functional elements in a process for determining to which set a principal entity belongs according to one embodiment of the invention. Start operation 301 is initiated and process 300 proceeds with determine operation 302 for analyzing the criteria of the requesting principal entity. From determine operation 302, process 300 proceeds to query operation 304 which determines whether the criteria of the principal entity match the criteria of a certain set, e.g., Set X 202 shown in FIG. 2A. If the criteria match, flow branches YES to associate operation 306 in which the principal entity is associated with Set X. From operation 306, process 300 proceeds to query operation 308 because entities can match more than one set definition. If the criteria do not match at query operation 304, flow branches NO to query operation 308 which determines whether the criteria of the principal entity match the criteria of another certain set, e.g., Set Y. If the criteria match, flow branches YES to associate operation 310 in which the principal entity is associated with Set Y for mapping purposes. From operation 310, process 300 passes to query operation 314 because, as noted, entities can match more than one set definition. If the criteria do not match at query operation 308, flow branches NO to query operation N 314, and shown by ellipses 312, for multiple queries. If the criteria of the principal entity do not match any sets, no matching occurs and the process ceases at return operation 318. If the principal's criteria is found to match Set N, flow branches YES to associate operation 316. Process 300 then proceeds to query operation 320 to determine if there are any other sets to consider. If there are no remaining sets to evaluate, process 300 branches NO to return operation 318. If there are remaining sets to consider, process 300 branches YES to continue queries operation 322, in which steps similar to 304-316 continue for the remaining sets. Once there are no longer any sets to consider for matching purposes, process 300 ceases at return operation 318.

Figure 4:
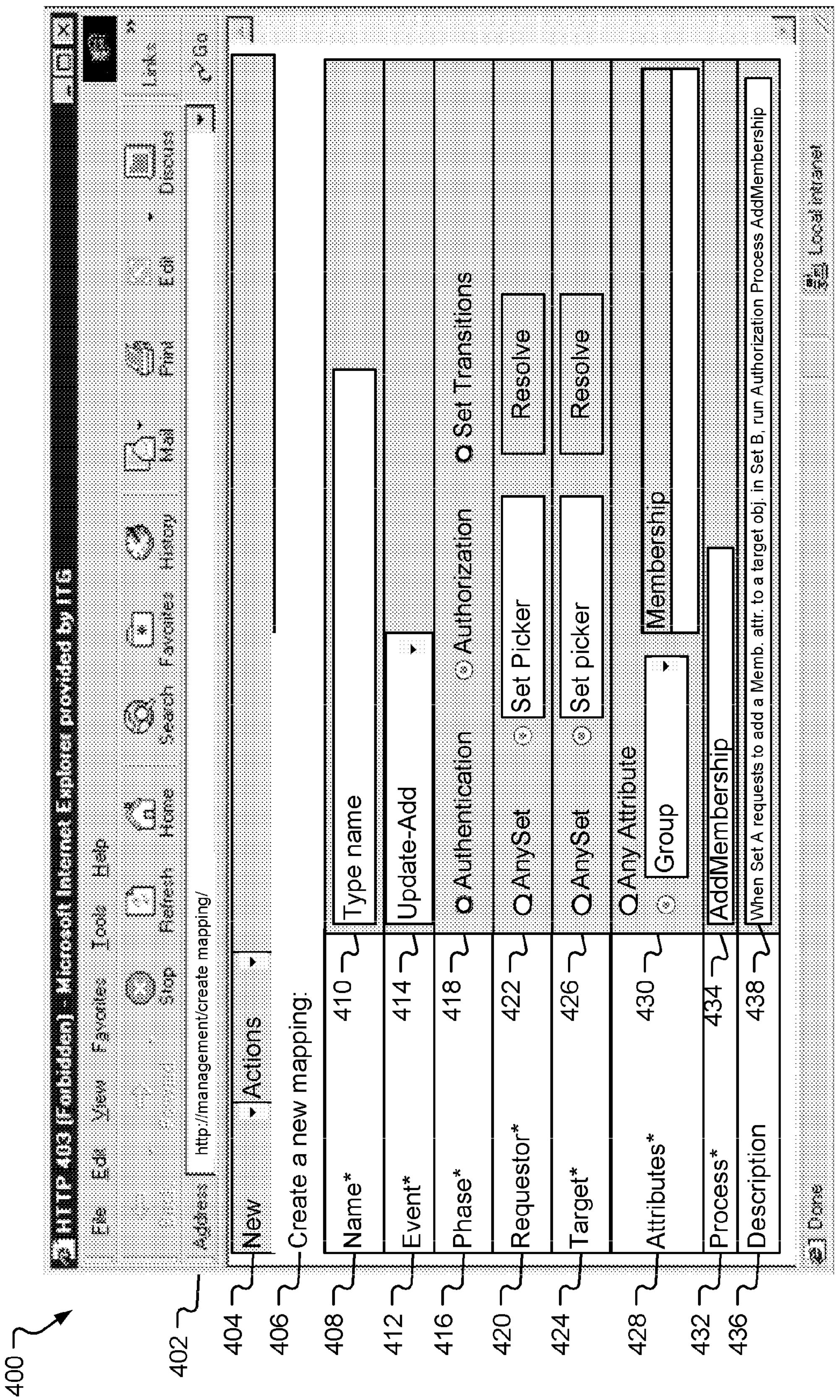
FIG. 4 depicts an exemplary detailed version of the user interface shown in FIG. 1 for creating a new mapping for a certain request type by a certain requester (principal), on a certain target, and during a certain phase in accordance with an embodiment of the present invention.

In a particular embodiment, user interface (UI) 400 shown in FIG. 4 may be used to create and/or edit a particular mapping. As shown at 406, this particular example is used to create a mapping. This UI may be accessed via the Internet through a specific URL 402. This URL is shown by way of example only. Any type, manner or form of access to a UI for creating a mapping may be covered by other embodiments of the present invention. Similarly, the scope of this invention is also intended to cover application or exposition of the concepts disclosed in API. User Interface 400 is offered merely as an exemplary embodiment and is intended in no way to limit the scope of the invention. A person of ordinary skill in the art would understand the present invention's coverage of API access, as well as any number of means of access known to those of ordinary skill in the art.

Returning to FIG. 4, user interface 400 enables a user, such as a system administrator or computer programmer 116, to create a mapping for associating a request processing phase with a request type, particular process, principal set, and target set. In an embodiment, the user 116 must name 408 the mapping by typing a name in cell 410. The event 412 for triggering the mapping and processing must be specified and is shown as Update-Add 414, or join, in FIG. 4. Next, the phase 416 of the processing request for the mapping being created is selected as authentication, authorization, or set transitions in the radio button selections 418. Since each of the phases may have workflows associated with them, the ability to select the phase involved in the mapping exists at 418. The requester 420, or principal, must also be specified as a condition for the mapping. The requester may be "Any" 422, meaning that the mapping is not concerned with what set the principal is in, or may be selected, as shown with "Set Picker" according to one embodiment of the invention. The same concepts apply to the target entity 424 and 426 choices. Also, attributes 428 of the target or principal may be specified as shown by the selection of Group 430 and the attribute selection of Membership. The process 432 is specified as AddMembership 434 to map the workflow to the phase, principal, target, and request type to join. Thus, as shown in description 436 and 438, this mapping provides for the processing of the expression, "When Set A requests to add a Membership Attribute to a Target Object in Set B, run the Authorization Process AddMembership." In this example, "Set A" (not shown) is selected with Set Picker 422 and "Set B" (not shown) is selected with Set Picker 426. As is readily apparent, UI 400 is offered by way of example only and is intended in no way to limit the scope of the invention. Any number of conceivable UI's and possible mapping combinations could readily be understood by those of ordinary skill in the art. Further, in other embodiments, the steps described, e.g., 408, 412, etc., may be optional, as opposed to required, or may be a combination of optional and required steps.

Figure 5:
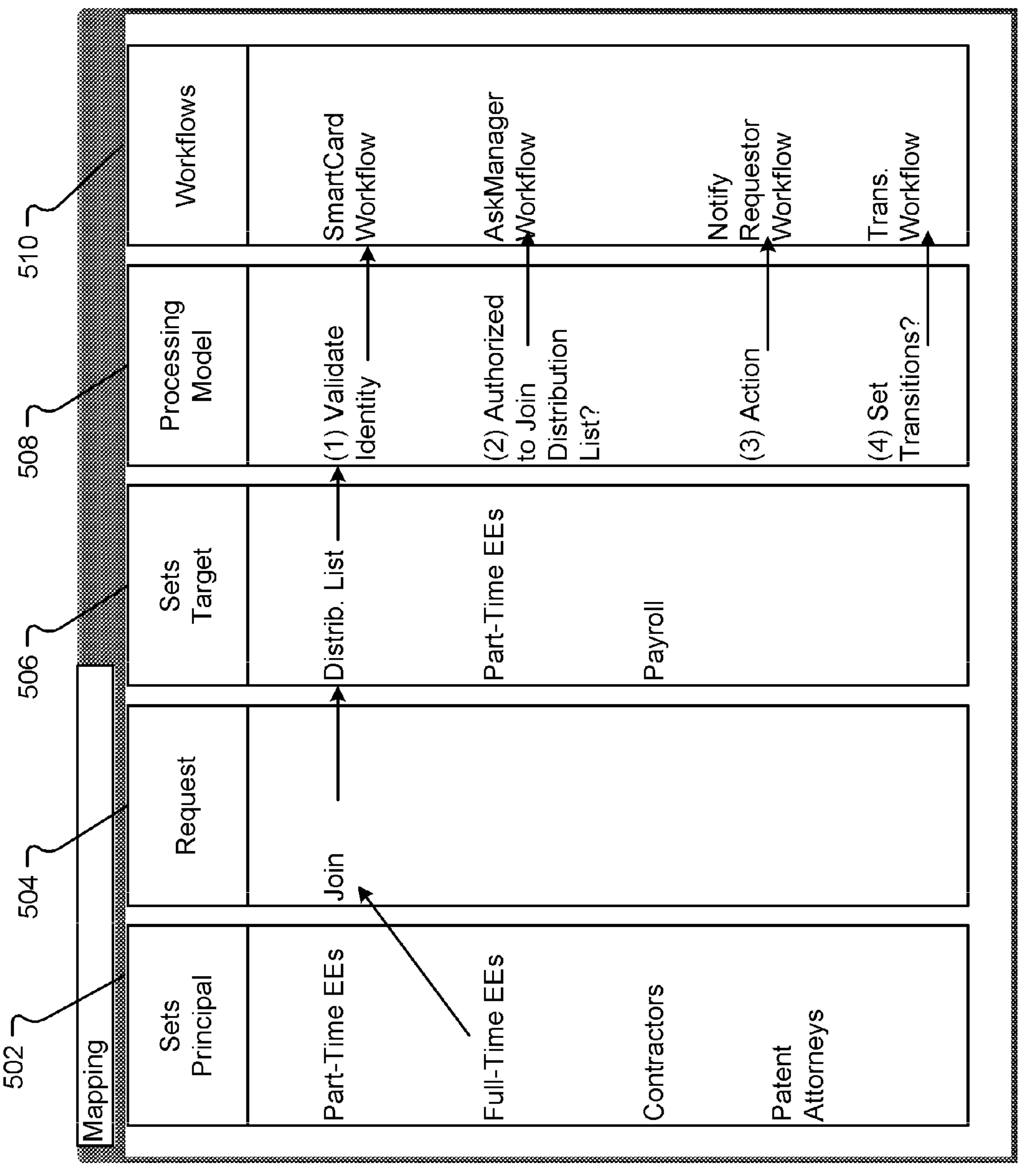
FIG. 5 illustrates the conceptualization of defining a mapping for a certain principal, target, request, and workflows associated with each phase of the processing model in accordance with an embodiment of the present invention.

Turning now to FIG. 5, a conceptualization of the model or mechanism of mapping 500 is shown. This exemplary mapping provides for the processing of the following exemplary expression: "When a Full-Time Employee makes a Request to join a Distribution List, validate his/her identity by running the Smartcard Workflow, then Ensure they are allowed to join by running the AskManager Workflow, then follow up by running the NotifyRequestor Workflow." As stated above, this is an expression of a mapping in accordance with an embodiment of the present invention. As can be seen, the set principal Full-Time EEs 502 is associated with the action request "join" 504 to add a full-time employee to the set target Distribution List 506. In an embodiment, each of the phases of the processing model is invoked in sequential order (if no phases are aborted, see below) 508 and the workflows 510 associated with each phase and specific to the target, principal, and request action are specified.

Figure 6:
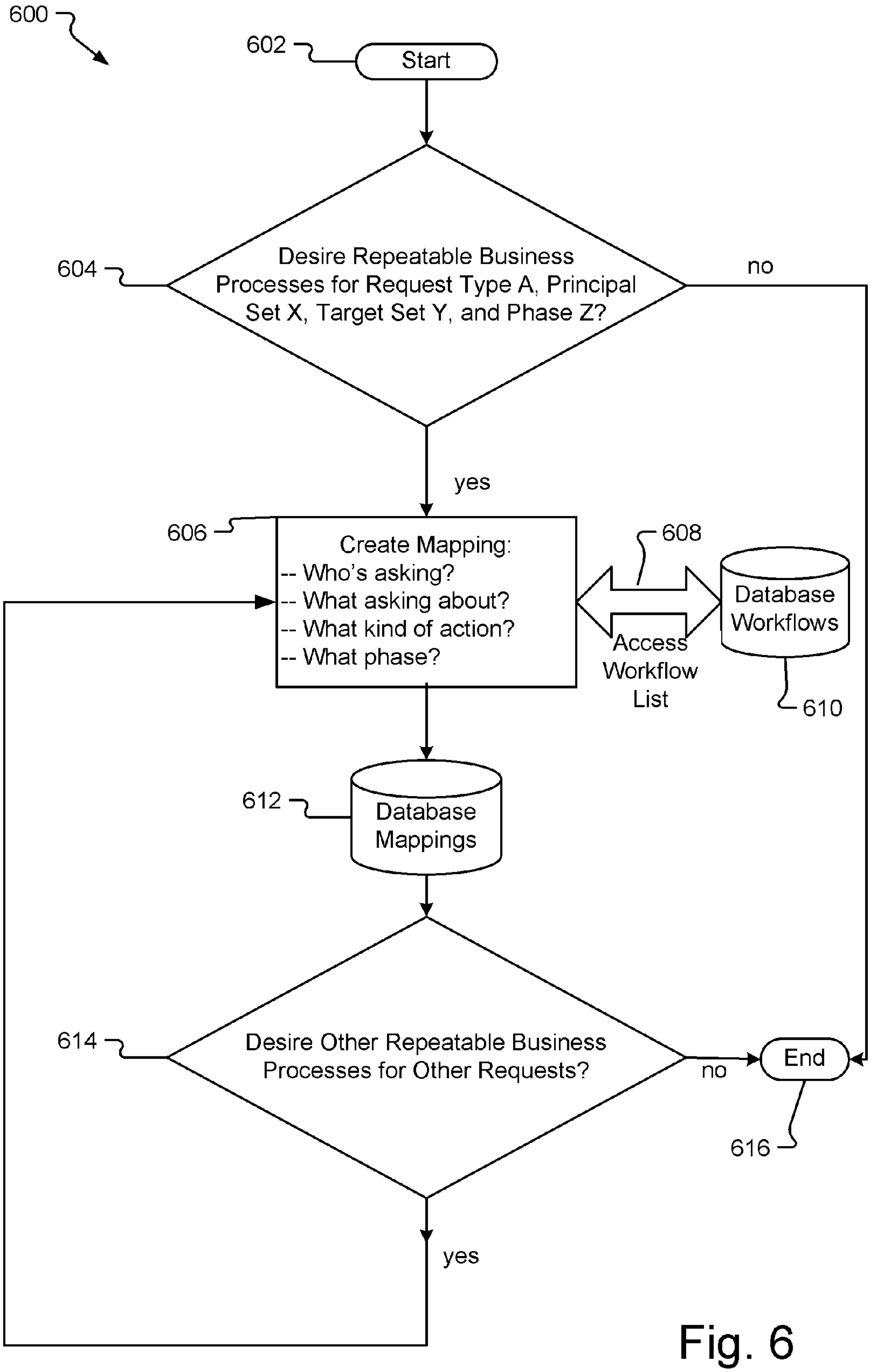
FIG. 6 is an exemplary flow diagram illustrating the operational characteristics of a process for creating and storing a mapping as shown in the logical representation in FIG. 1 in accordance with an embodiment of the present invention. As with FIG. 1.

While FIG. 4 shows the UI 400 for creating a mapping and FIG. 5 shows the conceptualization of the process of mapping, FIG. 6 depicts the operational steps 600 for creating and storing a mapping in accordance with an embodiment of the present invention. Start operation 602 is initiated and process 600 proceeds to query operation 604 in which it is determined whether user 116 desires to create a mapping for a certain principal, certain target, certain request type, certain phase, and the association of certain workflows therewith. If it is desired to create such a mapping, flow branches YES to create mapping operation 606. If it is not desired to create such a mapping, flow branches NO to end operation 616. In an embodiment, in operation 606, four questions are asked for associating the conditions for the processing desired, namely: "(1) Who's asking? (2) What is being asked about? (3) What kind of action is desired? and (4) What phase of processing is this mapping desired for?" Available workflows may be accessed 608 from a database 610 of stored workflow programs based on these questions. Once the mapping of workflows is created, it is saved or stored in database 612 for later retrieval. Process 600 continues to query operation 614, in which it is determined whether user 116 desires to create any other mappings for certain conditions. If further mappings are desired, flow branches YES to create mapping operation 606 and the above process repeats. If no further mappings are desired, flow branches NO to end operation 616. While any means of storage or memory may be used, databases 610 and 612 are shown as exemplary storage means.

Figure 7A:
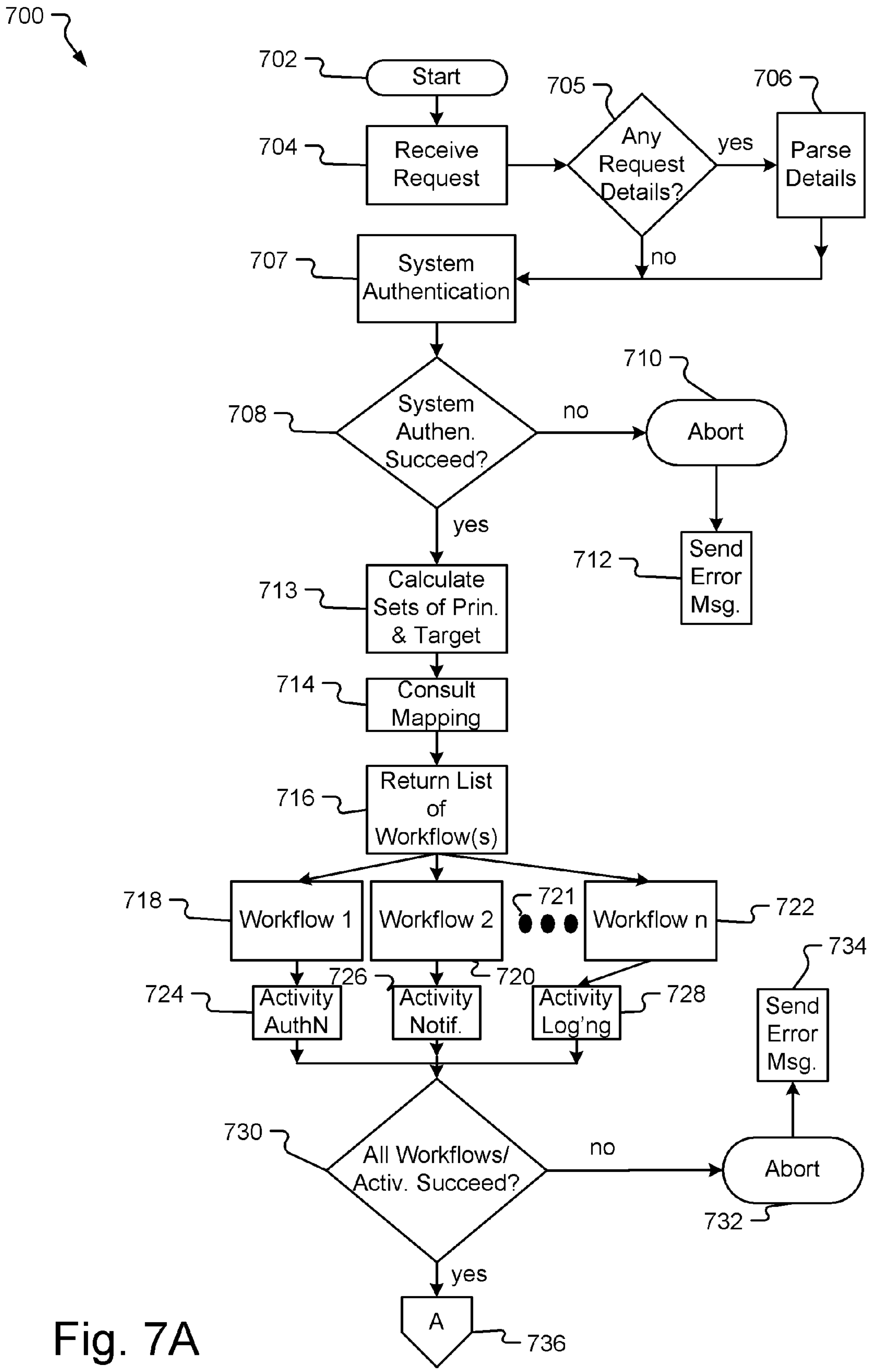
FIG. 7A is a flow diagram illustrating the operational characteristics of a process for responding to a request by running workflows with the first, or authentication, phase of the processing model based on pre-defined mappings in accordance with an embodiment of the present invention.

Turning now to FIG. 7A, process 700 for integrating workflows with the request type, sets, and phases of the core processing model is shown in accordance with an embodiment of the present invention. Start operation 702 is initiated in response to the entering of a request by a user 102 and receive request operation 704 receives the request. In some embodiments, process 700 proceeds to query operation 705 to determine whether there are any request details which to be considered, such as the attributes shown in FIG. 4. If there are attributes as part of the request, flow branches YES to parse details operation 706 in which these attributes are noted in expressing the request type, e.g., Update Membership Attribute of Group List. If there are no further details (or once the details are parsed), flow branches to system authentication 707, in which, for example, a simple token or certificate-based authentication on the part of the system occurs. Next, query operation 708 determines whether this system authentication was successful. If it was not successful, flow branches NO to abort operation 710. The failure may cause the display of an error dialog 712 on the screen in accordance with an embodiment of the invention. If the system authentication is successful, flow branches YES to calculate sets of principal and target operation 713. The rights in terms of the principal and actor sets are calculated. Once these rights are calculated, process 700 proceeds to consult mapping operation 714 which calculates the workflows of the mapping and returns a list 716 of such workflows to run. These workflows are then run in parallel 718, 720 and 722. Any number of workflows may be run, as shown, for example, by the Workflow listing of "Workflow 1" 718, "Workflow 2" 720, ellipses 721 and "Workflow n" 722. Further, activities within workflows may be run, as depicted by activities 724, 726 and 728 in accordance with an embodiment of the present invention. As shown, some activities are Authentication, Notification, Logging, etc. Authentication activity 724 may request additional data which validates the identity of the principal. Examples may include processes which request secrets from the user, such as, for example, "What is your mother's maiden name?" or physical validation of identity, such as, for example, Smartcard or Biometric devices. Notification activity 726, for example, may notify a third party (other than the principal and the supporting computer system) that a request has been made. Logging activity 728 records the request to the system, e.g., providing for logging which supports later auditing or is instituted for purposes of detecting attacks on the system.

Figure 7B:
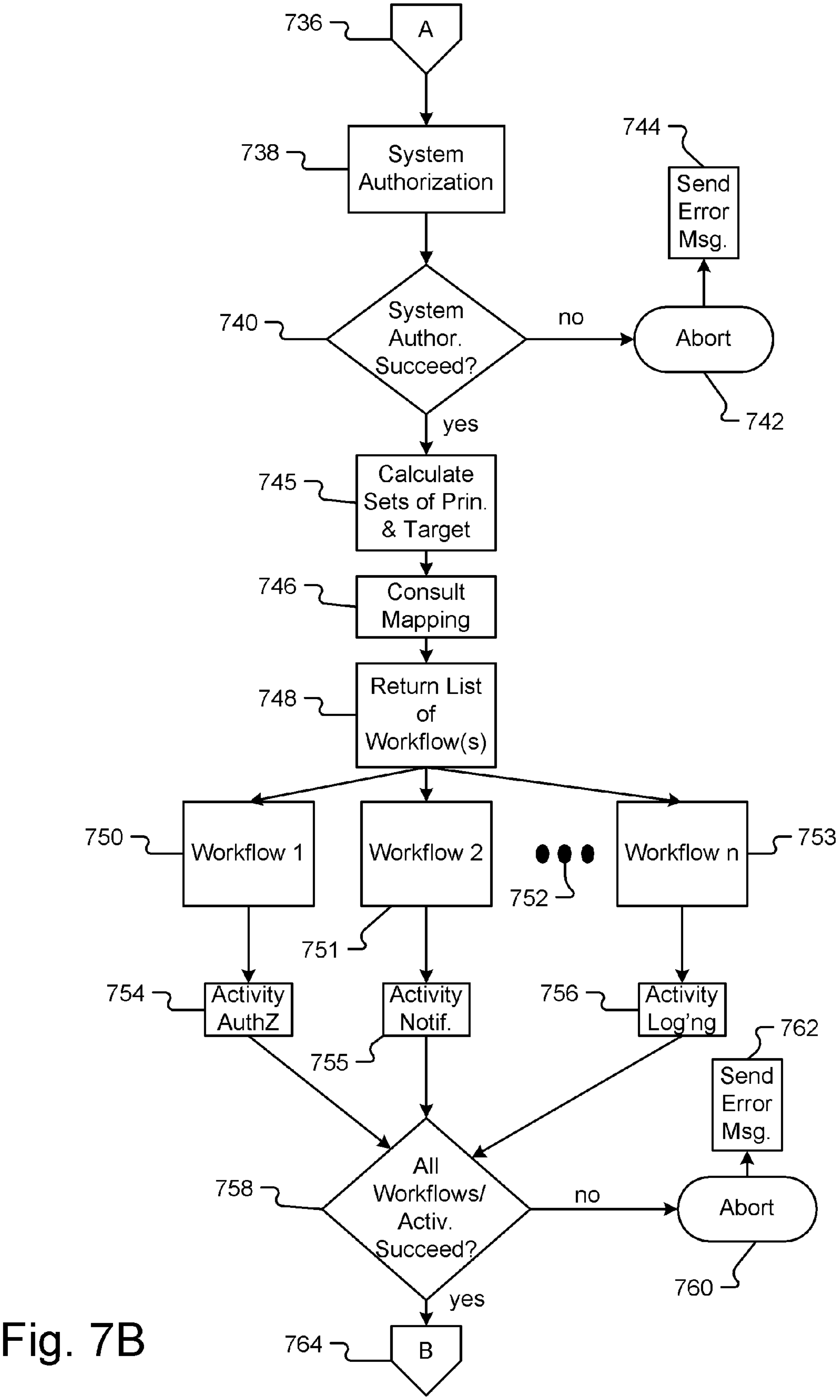
FIG. 7B is a flow diagram illustrating the operational characteristics of a process continuing from FIG. 7A for running workflows with the second, or authorization, phase of the processing model based on pre-defined mappings in accordance with an embodiment of the present invention.

Following the execution of the authentication workflows and/or activities, process 700 proceeds to query operation 730 in which it is determined whether all workflows and/or activities were successful. If they were not all successful, flow branches NO to abort operation 732 and error message 734 in accordance with an embodiment of the present invention. As shown, in this embodiment, the failure of any workflow or activity will cause the entire process to fail at this point. No further phases of processing will run. If all workflows were successful, flow branches YES to the next step A 736 shown in process 700 for purposes of continuing to the next page. Duplicate step A 736 is shown in FIG. 7B.

Next, the second phase of processing, i.e., authorization, occurs with system authorization 738. The system authorization phase typically follows data driven rights checking mechanisms, e.g., File System ACLs, built into the system. Query operation 740 determines whether the system authorization was successful. If it was not successful, flow branches NO to abort operation 742 and error message 744 in accordance with an embodiment of the present invention. If the system authorization was successful, flow branches YES to calculate sets of principal and target operation 745. The rights in terms of the principal and actor sets are calculated. Process 700 then proceeds to consult mapping operation 746 in which a single or multiple maps may be consulted in accordance with embodiments of the present invention. In this regard, it is worth noting that with respect to each phase, several maps may be applicable to a specific request type, request phase, principal, and target, and thus each of these maps and associating workflows will be run. Or, a single map may be consulted depending on the particular circumstances involved. From consult mapping operation 746, it is determined what workflows to run and a list 748 of such workflows is returned. These workflows are run in parallel in operations "Workflow 1" 750, "Workflow 2" 751 and "Workflow n" 753 in accordance with an embodiment of the present invention. Any number of workflows may be run, as shown by ellipses 752 and "Workflow n" 753. Further, activities within workflows may also be run if the mapping so requires, as depicted by activities 754, 755 and 756. As shown, some activities are authZ, Notification, and Logging, etc. according to an embodiment of the present invention. AuthZ, or confirmation of authority, activity 754 confirms the principal's authority to enact the request. For example, mail may be sent to the system's administrator or to an entity related to the principal, e.g., manager, confirming the principal's right to enact the request. Notification of approval or imminent action activity 755 notifies interested parties that the entity wishes to, or has been authorized to, enact a request. Logging activity 756 records to the system. Following these workflows and/or activities, process 700 passes to query operation 758 to determine if all of the workflows and/or activities were successful. If any workflow or activity was not successful, flow branches NO to abort 760 and error message 762 in accordance with an embodiment of the present invention. As noted above, the entire processing model fails if any workflow or activity fails. If the workflows and/or activities all succeed, flow branches YES to step B 764 which represents the continuation of process 700 to FIG. 7C and the duplicate step B 764 shown therein.

Figure 7C:
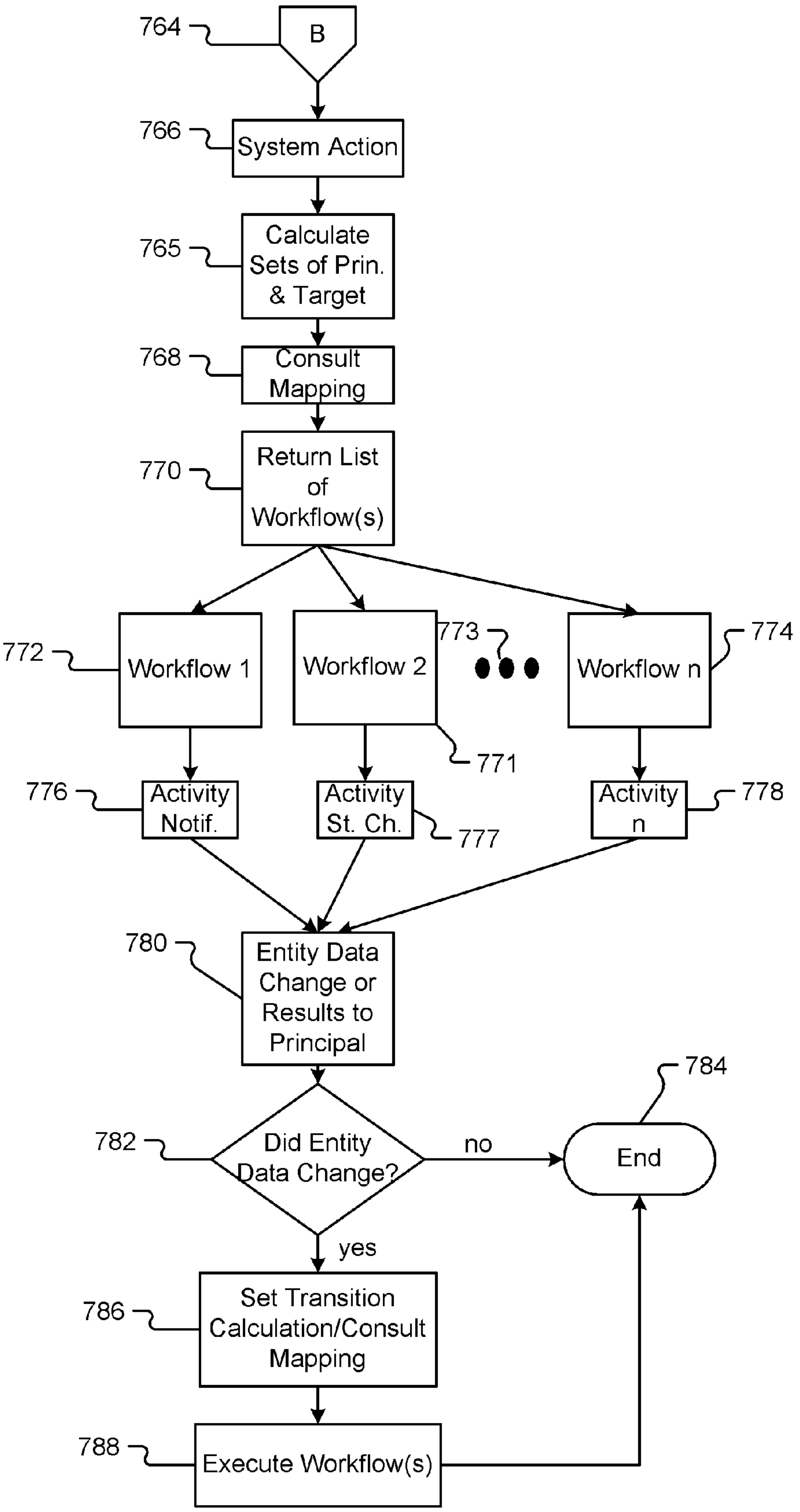
FIG. 7C is a flow diagram illustrating the operational characteristics of a process continuing from FIG. 7C for running workflows with the third, or action, phase and fourth, or consequence due to set transition, phase of the processing model based on pre-defined mappings in accordance with an embodiment of the present invention.

Turning to FIG. 7C, process 700 passes to system action operation 766 in which the request is actually enacted. Before this phase, no data has been retrieved and no changes have been made. Following the requested action, process 700 proceeds to calculate sets of principal and target operation 765. Next, mapping is consulted in consult mapping operation 768 for the Action phase. A list of workflow(s) is returned in operation return 770. These workflows are executed in parallel in operations "Workflow 1" 772, "Workflow 2" 771 and "Workflow n" 774 in accordance with an embodiment of the present invention. Any number of workflows may be run, as shown by ellipses 773 and "Workflow n" 774. Further, activities within workflows may also be run if the mapping so requires, as depicted by activities 776, 777 and 778. As shown, in accordance with embodiments of the present invention, reasonable activities include, although are not necessarily limited to, notification of activity or results activity 776, state changes activity 777, and any number of other activities "n" 778 known to those of ordinary skill in the art. Notification of activity or results activity 776 indicates to the principal or other interested parties that an action has taken place. Further resulting state changes activity 777 causes further changes on the target entity or entities in the system. Whether these workflows or activities fail or not, process 700 proceeds to entity data change or results to principal operation 780 as shown in the delivery of results embodiment 106 in FIG. 1. Next, the process continues to query operation 782, in which it is determined whether an entity data change occurred. If no state change occurred, flow branches NO to end operation 784, and process 700 terminates. If a state change occurred, flow branches YES to set transition calculation/consult set transition mapping 786, in which it is determined what processes should run as a consequence of the action. Set transitions are mapped like any mapping for any other manipulation. A set transition, or state change, occurs, by way of example only, when an employee changes from a Full-Time Employee to a Part-Time Employee. The system administrator may want certain processes to fire automatically based on such a state change. For example, it may be desired to run a Revoke Benefits process since the employee is no longer working full-time and is not entitled to benefits. After consulting the set transitions mapping, the workflow(s), if any, are executed 788 and process 700 terminates at end operation 784. It is worth noting that execute operation 788 represents, in abbreviated form, the similar process to operations 770-774. The single operation 788 thus embodies processes wherein workflows are executed in parallel. These workflows may contain activities therein which are executed in parallel as well, similar to operations 776-778. The use of the single execute operation 788 is thus intended to represent the same type of process shown in these operations and is intended in no way to limit the scope of the invention.

Figure 8:
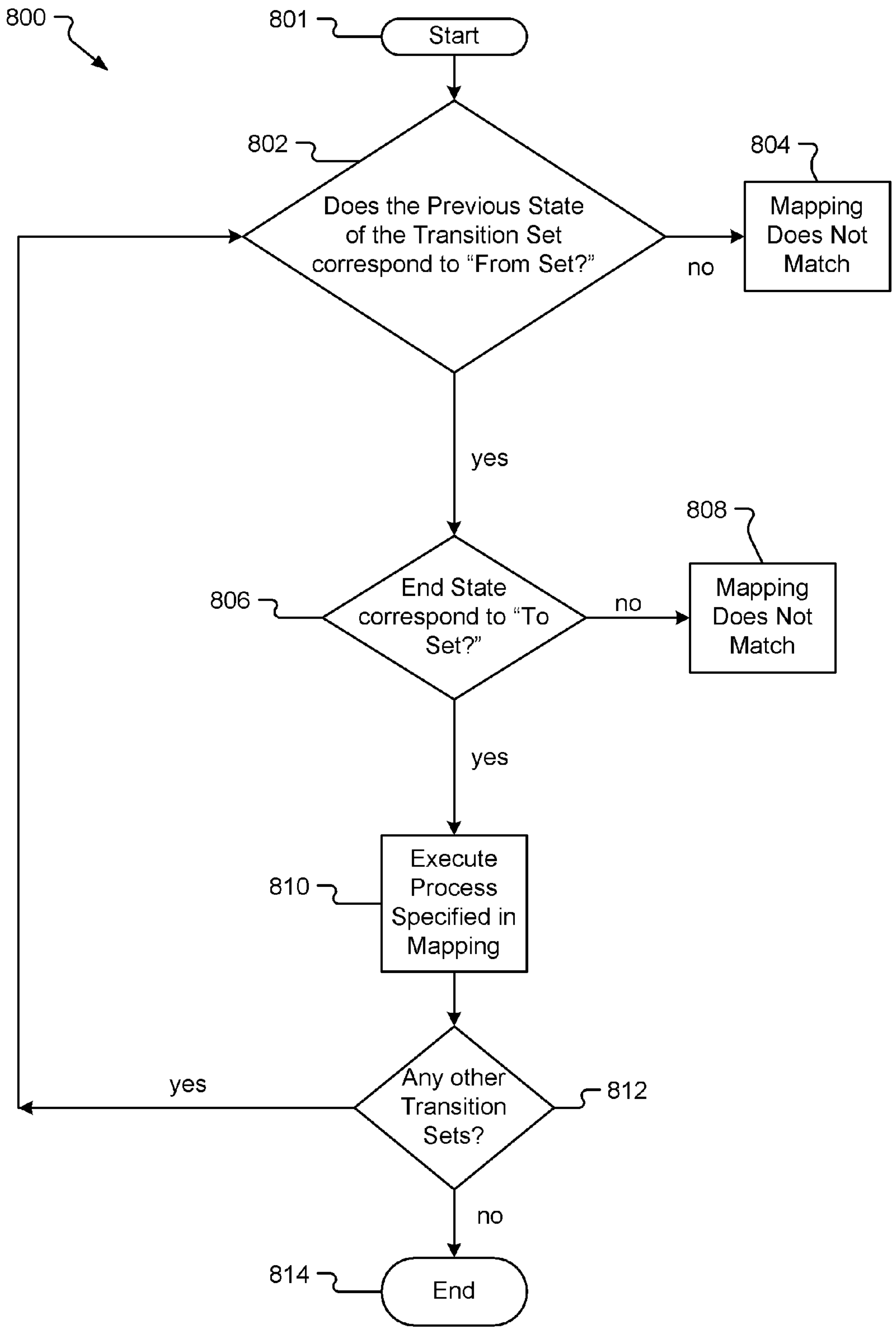
FIG. 8 is a flow diagram illustrating the operational characteristics of a process for retrieving a consequence due to set transitions mapping based on certain conditions involving a state change resulting from a prior action executed in the action phase shown in FIG. 7C in accordance with an embodiment of the present invention.

While FIG. 7C shows the consult mapping operation 786 for set transitions and the execution 788 of any resulting workflows for such state changes, FIG. 8 shows the flow operations leading up to the execution of processes specified in a set transitions mapping where a state change has occurred in accordance with an embodiment of the present invention. Set transition maps are defined as "from,to." This definition is best illustrated by consulting FIG. 8. Process 800 begins with start operation 801 which is initiated in response to the identification of a set transition. For each transition set, process 800 proceeds to query operation 802 in which it is determined whether the Previous State of the transition set corresponds to "From Set." If there is no correspondence, the mapping does not match and flow branches NO to operation 804. If the Previous State corresponds to "From Set," flow branches YES to End State query operation 806 which determines whether the end state corresponds to the "To Set." If there is no correspondence, flow branches NO to mapping does not match operation 808. If the end state corresponds to "To Set," flow branches YES to execute operation 810, in which the process (or processes) specified in the mapping is (are) executed. Process 800 next proceeds to query operation 812 which determines whether there are any other transition sets. If other transition sets exist, flow branches YES to query operation 802 and the process repeats. If there are no other transition sets, flow branches NO to end operation 814 which terminates process 800.

In accordance with an embodiment of the present invention, in defining the "From Set" and "To Set," the term "Any" may be used by the creator of the mapping. The term "Any" in "From" or "To" means "this always matches." In other words, the creator of the mapping does not care where the set was previously or where or how it is changed for this mapping to take effect. Similarly, and in accordance with an embodiment of the present invention, if the object did not previously exist, the "From Set" is "NULL." If the object is being deleted, i.e., the object no longer exists as result of a state change, the "To Set" is "NULL." In other embodiments, any number of means reasonably known to those of ordinary skill in the art could be used, and the examples given herein of the specific terminology "Any" and "NULL" are not intended to limit the scope of the invention in any way. Further, process 800 is shown at a high level for purposes of teaching the present invention and is not intended to limit the scope of this invention. In other embodiments, additional or more specific operations reasonably known to those of ordinary skill in the art are included without departing from the scope of the invention embodied in FIG. 8. By way of example only, processes following operations 804 and 808 could include retrieving other mappings (if any), consulting other mappings (if any), etc.

Figure 9:
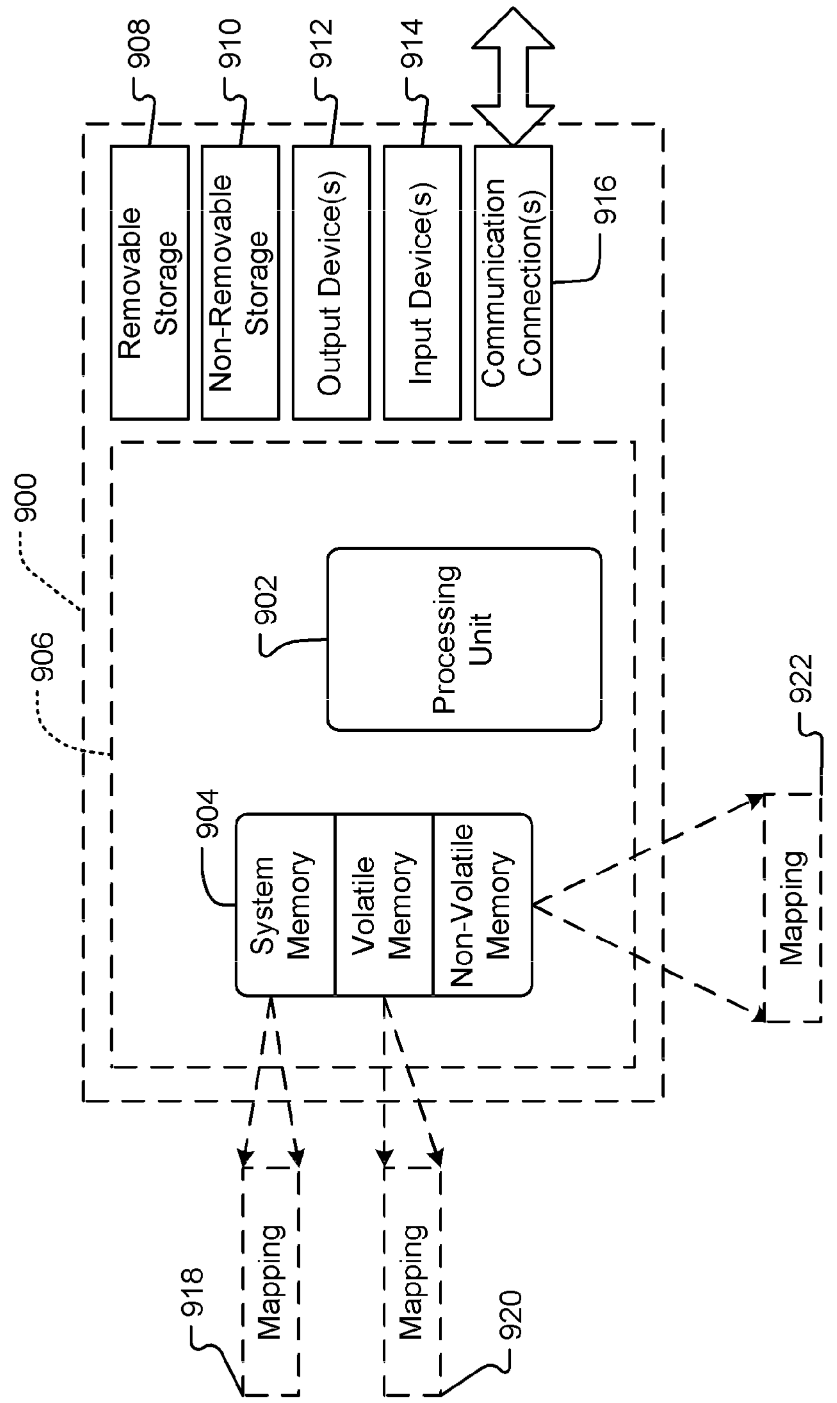
FIG. 9 depicts an exemplary computing system upon which embodiments of the present disclosure may be implemented in accordance with an embodiment of the present invention.

Finally, FIG. 9 illustrates an exemplary computing system 900 upon which the present invention may be implemented. A computer system 900, which has at least one processor 902 for processing the requests shown in FIG. 1, is depicted. The system 900 has a memory 904, in which a mapping 918 (or 920 or 922) is located. In its most basic configuration, computing system 900 is illustrated in FIG. 9 by dashed line 906. Additionally, system 900 may also include additional storage (removable and/or non-removable) including, but not limited to, magnetic or optical disks or tape. Such additional storage is illustrated in FIG. 9 by removable storage 908 and non-removable storage 910. Computer storage media includes volatile and nonvolatile, removable and non-removable media implemented in any method or technology for storage of information such as computer readable instructions, data structures, program modules or other data. Memory 904, removable storage 908 and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired mapping or processing information, for example, and which can be accessed by system 900. Any such computer storage media may be part of system 900. Depending on the configuration and type of computing device, memory 904 may be volatile, non-volatile or some combination of the two. With respect to memory 904, the mapping of the present invention could be in system memory 918, volatile memory 920, or non-volatile memory 922 in accordance with embodiments of the present invention. The illustration in FIG. 9 is intended in no way to limit the scope of the invention. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

System 900 may also contain communications connection(s) 916 that allow the device to communicate with other devices. Additionally, to input content into the cells of the UI 400 in accordance with an embodiment of the invention, system 900 may have input device(s) 914 such as a keyboard, mouse, pen, voice input device, touch input device, etc. Output device(s) 912 such as a display, speakers, printer, etc. may also be included, in which such devices may be used to display the UI for creating a mapping as shown in FIG. 4 in accordance with embodiments of the present invention. All of these devices are well known in the art and need not be discussed at length here.

Having described embodiments of the present disclosure with reference to the figures above, it should be appreciated that numerous modifications may be made to the present invention that will readily suggest themselves to those skilled in the art and which are encompassed within the scope and spirit of the invention disclosed and as defined in the appended claims. Indeed, while embodiments have been described for purposes of this disclosure, various changes and modifications may be made which are well within the scope of the present invention.

Similarly, although this disclosure has used language specific to structural features, methodological acts, and computer-readable media containing such acts, it is to be understood that the subject matter defined in the appended claims is not necessarily limited to the specific structure, acts, features, or media described herein. Rather, the specific structures, features, acts, and/or media described above are disclosed as example forms of implementing the claims. Aspects of embodiments allow for multiple request types, request combinations, request sub-combinations, multiple requesters, multiple targets, and multiple workflows. Or, in other embodiments, a single request could be made by a single requester for a single target with the association of a single workflow. One skilled in the art will recognize other embodiments or improvements that are within the scope and spirit of the present invention. Therefore, the specific structure, acts, or media are disclosed as exemplary embodiments of implementing the claimed invention. The invention is defined by the appended claims.

What is claimed is:

1. A method of processing data-oriented or procedural requests, comprising:

receiving a request by a requesting agent;

consulting a mapping to determine workflows associated with phases of a processing model, including an authentication workflow;

executing the authentication workflow;

if the authentication workflow is successful, consulting a mapping to determine a workflow associated with an authorization phase;

executing the authorization workflow;

if the authorization workflow is successful, consulting a mapping to determine a workflow associated with an action phase; and executing the action workflow.

2. The method as defined in claim 1, the method further comprising:

parsing the request to determine if there are any request details constituting conditions for a certain mapping.

3. The method as defined in claim 1, the method further comprising:

determining if there is an entity data change;

if there is an entity data change, consulting a mapping for a set transition; and executing the process specified in the consulted mapping.

4. The method as defined in claim 1, the method further comprising:

executing one or more activities within one or more workflows associated with each phase if specified by the mapping.

5. The method as defined in claim 4, wherein the activities comprise one or more of the following: authentication, notification, and logging.

6. The method as defined in claim 1, the method further comprising:

organizing principal entities into sets based on matching criteria; and organizing target entities into sets based on matching criteria.

7. The method as defined in claim 6, the method further comprising:

creating mappings by associating workflows to processing phases dependent on the sets the principal belongs to and the sets the target belongs to.

8. The method as defined in claim 1, wherein the method further comprises one or more of the following steps: executing a system authentication, executing a system authorization, and executing a system action.

9. A system for processing data-oriented or procedural requests, the system comprising:

at least one processor; and a memory coupled to the at least one processor, the memory comprising computer executable instructions that, when executed by the at least one processor perform a method of processing data-oriented or procedural requests comprising:

receiving a request by a requesting agent;

executing a system authentication of the requesting agent;

determining one or more workflows associated with one or more phases of a processing model; and executing an authentication workflow.

10. The system as defined in claim 9, wherein the method further comprises executing a system authorization for the request if the authentication workflow is successful.

11. The system as defined in claim 10, wherein the method further comprises:

consulting a mapping to determine a workflow associated with an authorization phase; and executing executes the authorization workflow.

12. The system as defined in claim 11, wherein the computing system executes a system action for the request if the authorization workflow is successful.

13. The system as defined in claim 12, wherein the method further comprises, consulting a mapping to determine a workflow associated with the action phase.

14. The system as defined in claim 13, wherein the method further comprises, executing the action workflow.

15. The system as defined in claim 14, wherein the method further comprises determining if there is a set transition.

16. The system as defined in claim 15, wherein the method further comprises:

consulting a mapping for the set transition; and processing the set transition.

17. A computer-readable medium not consisting of a propagated data signal, the computer readable medium comprising computer executable instructions which when executed by a computer perform a method of processing a request with mapping and repeatable processes comprising:

receiving a request;

executing a system authentication of the requesting agent;

executing any authentication workflows associated with the system authentication based on mapping;

if the authentication workflow is successful, executing a system authorization for the request;

executing any authorization workflows associated with the system authorization for the request based on mapping;

if the authorization workflow is successful, executing a system action for the request; and executing the action workflow based on mapping.

18. The computer-readable medium as defined in claim 17 wherein the request is parsed to determine if there are any request details constituting conditions for a certain mapping.

19. The computer-readable medium as defined in claim 18, further comprising:

determining if there is an entity data change;

if there is an entity data change, consulting a mapping for a set transition; and executing the process specified in the consulted mapping.

* * * * *